June 17, 1958  H. A. DITMAR JANSSE  2,838,934
HEAT TRANSMISSION INDICATING SYSTEM FOR SUGAR SOLUTION
Filed Sept. 8, 1955
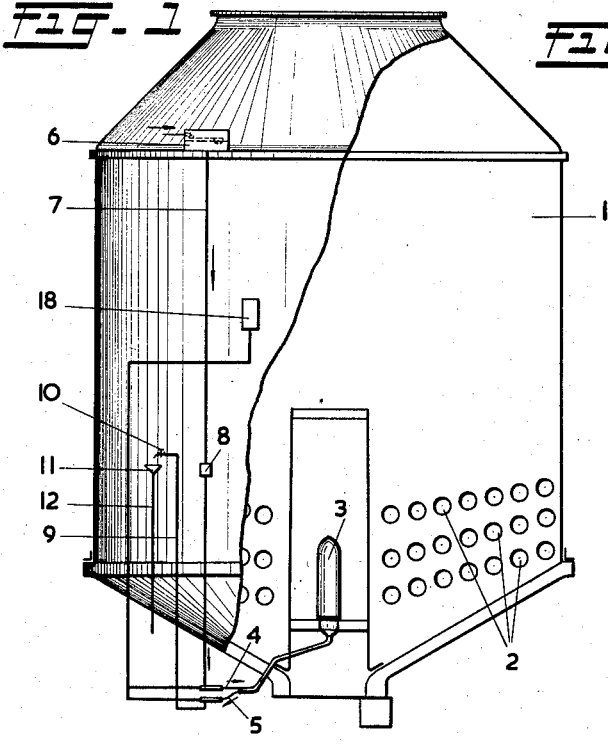
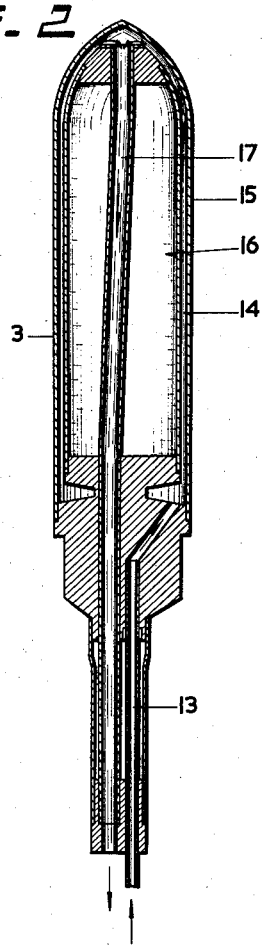
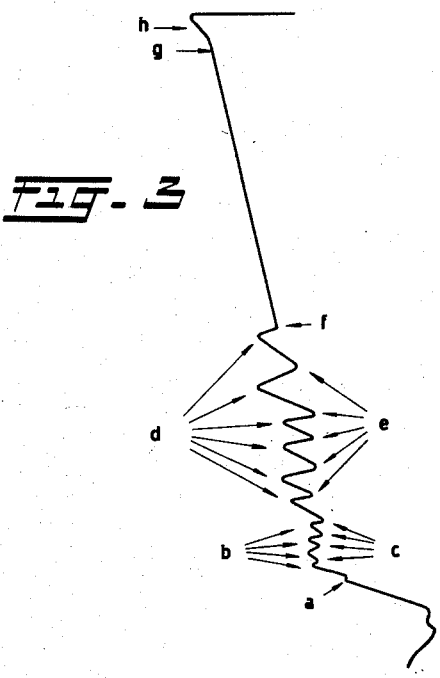

United States Patent Office 2,838,934
Patented June 17, 1958

2,838,934

HEAT TRANSMISSION INDICATING SYSTEM FOR SUGAR SOLUTION

Hermanus A. Ditmar Jansse, Naarden, Netherlands, assignor to Ditmar Zonen N. V., Naarden, Netherlands, a corporation of the Netherlands Application September 8, 1955, Serial No. 533,159

Claims priority, application Netherlands September 11, 1954

4 Claims. (Cl. 73—349)

Dutch Patent 37,776 describes a heat transmission sensing device in a boiling pan, more particularly for boiling down sugar juices to a crystalline product. Said heat transmission sensing device is based on the principle that the transmission of heat from a vessel placed in the central bottom space of the boiling pan, through which vessel steam is passed, to the boiling mass is dependent on the condition of said boiling mass, for the transmission of heat depends on various factors such as the circulation and the viscosity of the boiling mass, the amount of crystals in the same, etc. From the indications given by said heat transmission sensing device the operator may draw conclusions, therefore, with regard to the manner in which the boiling process should be conducted.

The present invention relates to a similar heat transmission sensing device, which, however, has certain advantages over the device described in Dutch Patent 37,776. The heat transmission sensing device according to the invention likewise employs the transmission of heat between the boiling mass and a vessel arranged in the central bottom space of the boiling pan, but as a heat transmitting medium water is used and the indications obtained are based on the difference in temperature between the water fed into said vessel and the water discharged therefrom.

The heat transmission sensing device according to the invention comprises a jacketed vessel arranged in the central bottom space of the boiling pan and provided with a water feed and a water discharge line, one of which is connected with one end of the jacket whereas the other is connected with the other end of the jacket, and an indication device controlled by thermometers in the feed and in the discharge line for indicating the transmission of heat between the boiling mass and the water in the vessel.

Preferably a device for obtaining a constant feed pressure of the water current is provided in the water feeding apparatus, for example a float tank, or a reducing valve.

The water discharge line is preferably so constructed that its discharge opening is located above the lowest point of the line and ends in an open funnel, so that the water is also discharged at a constant counter-pressure. The rate of flow of the water through the vessel may be controlled by a suitable device provided in the supply or discharge line, e. g. a needle valve or measuring flange. Because the water flows from the discharge line into an open funnel it is easy for the operator to see whether the water flows regularly.

The vessel should consist of a conductive material and, therefore, it is usually made from metal in actual practice.

The indications of the heat transmission sensing device are based on the difference in temperature of the water entering the vessel and the water which is discharged therefrom after being heated by the boiling mass when flowing through the jacket. This difference in temperature is substantially independent of the temperature of the feed water, so that it is unnecessary to take care that the water supplied has a constant temperature.

The invention will be illustrated with reference to the drawing which diagrammatically shows a boiling pan with the heat transmission sensing device arranged therein.

The boiling pan 1 is provided with a coil 2 in the conventional manner. In the central bottom space of the boiling pan the heat transmission sensing vessel 3 is so arranged that its top is just below the lowest possible level of the juice, said vessel being secured with strong brackets to the casing of the coil, in such a manner that the vessel is in a vertical position and is equidistantly spaced from the coil on all sides. The heat transmission sensing vessel should not be placed too low, because in many pans there is a dead angle in the lower part of the conical space in which no circulation takes place.

At the lower side of the heat transmission sensing vessel there is an easily bendable copper tube leaving the boiling pan via a packing gland through the bottom thereof, said packing gland being screwed from the outside into the bottom of the pan.

Through said copper tube two lines run that are connected respectively with the manifold 4 for the water fed into the vessel and with the manifold 5 for the water discharging from the vessel.

The water is fed to the vessel through line 7 which extends exteriorly of the pan and includes a tank 6 provided with a float for controlling the water feed to line 7 and a filter 8. Tank 6 is conveniently referred to as a "float tank." The water discharged from the vessel passes via line 9 to a needle valve 10 and flows into the open funnel 11 from which the water drains via the tube 12, so that the operator may always see whether the water is still running. By means of said needle valve the rate of flow of the water through the device may be controlled.

In Figure 2 a section of the heat transmission sensing vessel 3 is shown on a larger scale. The water is supplied through tube 13 and enters the annular space 14 between the walls 15 and 16. Said annular space has a relatively large surface and a small cross-sectional area, so that the conditions are favorable for a rapid transmission of heat. The heated water flows back through the centrally arranged tube 17 to the manifold 5.

In or near the manifolds, thermometers are provided. The difference in temperature indicated by said thermometers is registered on a strip in the recording apparatus 18 in a conventional way.

Figure 3 shows a graph obtained by means of such a recording apparatus.

The valve of the float tank 6 and the needle valve 10 are first fully opened. Water is allowed to flow through the system for some time in order to remove all the air from the same.

The final adjustment of the needle valve in order to obtain the desired flow of water may best be effected at the moment of the formation of crystals, either when introducing seed crystals or at the moment when the first crystals form spontaneously. The writing pin of the recording device then reaches the point $a$ of the graph.

When the crystal has sufficiently developed the pin has descended to a point $b$. The further crystal formation is then interrupted by drawing in liquid of lower density, the pin thereby arriving in a point $c$. This manipulation is repeated some times until the crystal is sufficiently strong and there is a favorable relation between crystal surface and mother liquor. During this manipulation the curve on the graph moves between the points $b$ and $c$.

It is now possible to further concentrate the sugar juice by evaporation because the crystal has sufficiently developed and is sufficiently "closed," so that no secondary crystals will be produced. Concentrating is continued up to a point $d$. It is then possible to draw in a larger amount of juice, so that a point $e$ is reached. These treatments are also repeated a number of times and it is possible to gradually raise the concentrations in the points $d$ in order to obtain a better exhaustion of of the mother liquor.

In the point $f$ the crystal has developed to such an extent and the pan is filled so far that the further drawing in of juice may be effected continuously. At point $g$ the drawing in of juice is discontinued. At point $h$ the boiling is finished, so that the pan may be emptied.

If the graph has been once recorded in this manner for a favorably proceeding boiling process, the operator when treating a subsequent charge only need to follow said graph to be sure that the process is conducted in an adequate manner.

The heat transmission sensing device according to the invention, has various advantages over the apparatus described in Dutch Patent 37,776. Thus, for example, no steam is required, but only cold water and the operation of the apparatus, therefore, cannot be influenced by fluctuations in steam pressure. Moreover steam valves, reducing valves and the like are unnecessary, so that the device has a greater reliability and functions more easily. The results obtained with said device in actual practice are very favorable.

I claim:

1. In a boiling pan for concentrating and crystallizing sugar solutions having means for feeding a sugar solution to the boiling pan, means for discharging crystallized sugar syrup therefrom, means for evacuating air from the boiling pan, and means for heating the sugar solution in said pan, the combination of means for continuously indicating changes in the heat transmission properties of the sugar solution while said solution is being concentrated and crystallized, said last-named means being disposed centrally of the lower portion of said pan and comprising an element having an inner jacket and an outer jacket defining an annular space therebetween, means including a feed line for feeding water at a constant rate to a first end of said annular space, means including a discharge line for withdrawing said water from the second end of said annular space after said water has flowed from said first end to said second end of said space in contact with said outer jacket the outer surface of which is in contact with the sugar solution in said pan, and means for registering the difference between the temperature of the water supplied to said first end and the temperature of the water removed from said second end.

2. A boiling pan construction as defined in claim 1, wherein said feed line includes a tank provided with a float for controlling the water feed to said line.

3. A boiling pan construction as defined in claim 1, wherein at a level located above the lowermost point of the discharge line said line terminating in an upwardly extending portion which discharges into the top of an open funnel.

4. A boiling pan construction as defined in claim 1, wherein a needle valve is provided in said discharge line.

References Cited in the file of this patent

UNITED STATES PATENTS

| 300,202 | Boulier | June 10, 1884 |
| 2,682,172 | Olcott | June 29, 1954 |

FOREIGN PATENTS

| 2,400 | Great Britain | June 17, 1878 |
| 1,698 | Great Britain | Apr. 4, 1883 |